United States Patent [19]

Saint Felix et al.

[11] Patent Number: 4,984,160
[45] Date of Patent: Jan. 8, 1991

[54] METHOD FOR IMAGE RECONSTRUCTION THROUGH SELECTION OF OBJECT REGIONS FOR IMAGING BY A COMPARISON OF NOISE STATISTICAL MEASURE

[75] Inventors: Didier Saint Felix, Boulogne; Ann rougee, Fontenay Aux Roses; Yves Trousset, Paris, all of France

[73] Assignee: General Elecrtric CGR SA, Issy les Moulineaux, France

[21] Appl. No.: 301,904

[22] Filed: Jan. 25, 1989

[30] Foreign Application Priority Data

Dec. 22, 1988 [FR] France .................................. 88 17001

[51] Int. Cl.$^5$ .................................................. G06F 15/42
[52] U.S. Cl. ............................ 364/413.19; 364/413.15
[58] Field of Search ..................... 364/413.14, 413.23, 364/413.13, 413.15

[56] References Cited

U.S. PATENT DOCUMENTS

| | | | |
|---|---|---|---|
| 4,751,643 | 6/1988 | Lorensen et al. | 364/413.13 |
| 4,791,567 | 12/1988 | Cline et al. | 364/413.13 |
| 4,821,213 | 4/1989 | Cline et al. | 364/413.13 |

OTHER PUBLICATIONS

Journal of Computer Assisted Tomography, vol. 3, No. 4, Aug. 1979, pp. 439–446, Raven Press, New York, U.S.; L. D. Harris et al.: "Display and Visualization of Three-Dimensional Reconstructed Anatomic Morphology: Coronary Vasculature of Dogs"–*Summary; pp. 441–443*.

Physics in Medicine & Biology, vol. 29, No. 4, Apr. 1984, pp. 329–339, The Institute of Physics, Bristol, GB; K. Faulkner et al.: "Noise and Contrast Detection in Computed Tomography Images", *Summary, p. 333–p. 334; pp. 338, 339*.

Proceedings of Melecon'85, Madrid, Oct. 8–10, 1985, vol. 2: "Digital Signal Processing", pp. 221–225, IEEE, New York, U.S.; I. E. Magnin et al.: "Three Dimensional Reconstruction in Coded-Source Imaging".

Primary Examiner—Michael R. Fleming
Assistant Examiner—Gail O. Hayes
Attorney, Agent, or Firm—Oblon, Spivak, McClelland, Maier & Neustadt

[57] ABSTRACT

The fact that a vascular tree occupies a very small portion of the surrounding space is profitably employed for reducing the number of reconstruction calculations and improving the quality of this reconstruction without thereby making restrictive geometrical hypotheses. A support region of the object is determined. An estimation of the object to be reconstructed is then carried out on the support region by means of an algebraic method. Determination of the object support involves a statistical evaluation of the detected observations and a comparison of this evaluation with a measurement of the intrinsic noise of the measurement chain. Noise problems are overcome by means of the statistical study. By utilizing a second estimation stage, and taking the support into account, one avoids a restrictive implicit assumption on a convex shape of the objects to be studied.

8 Claims, 3 Drawing Sheets

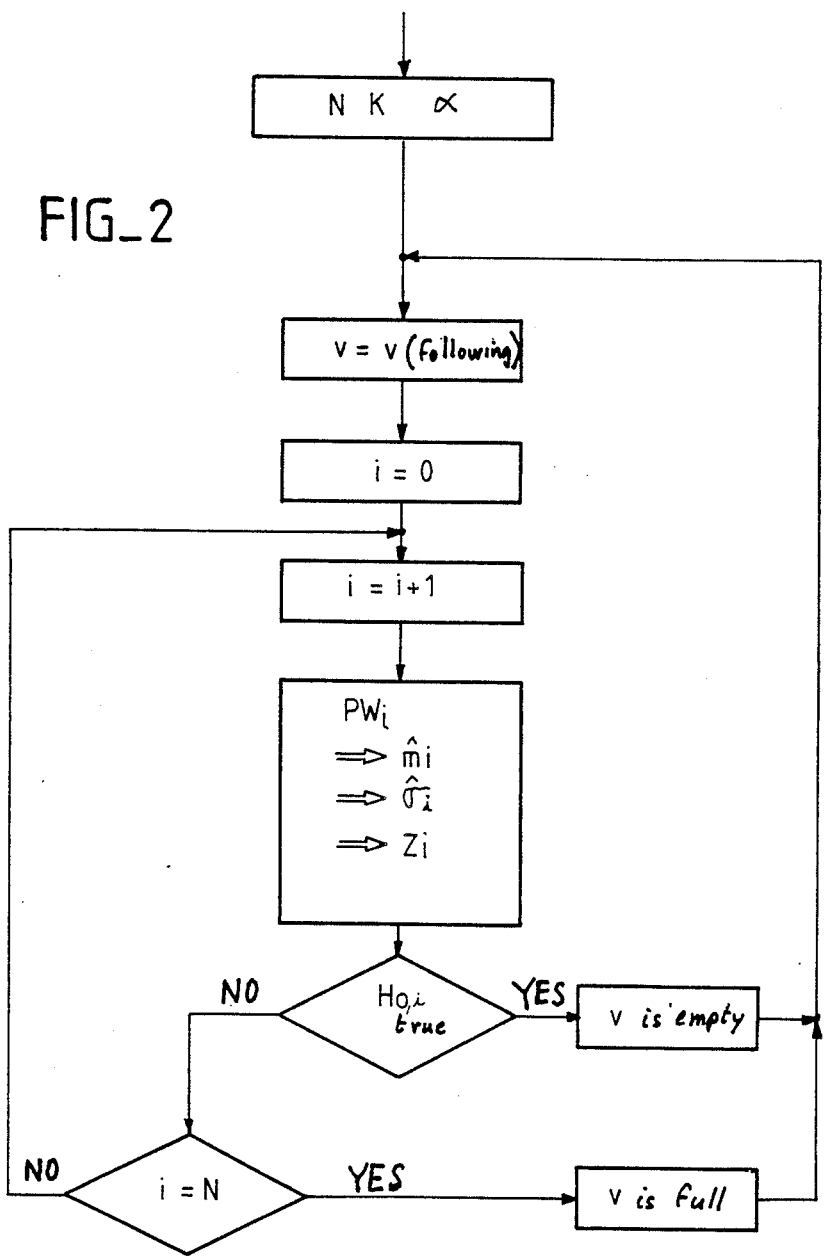

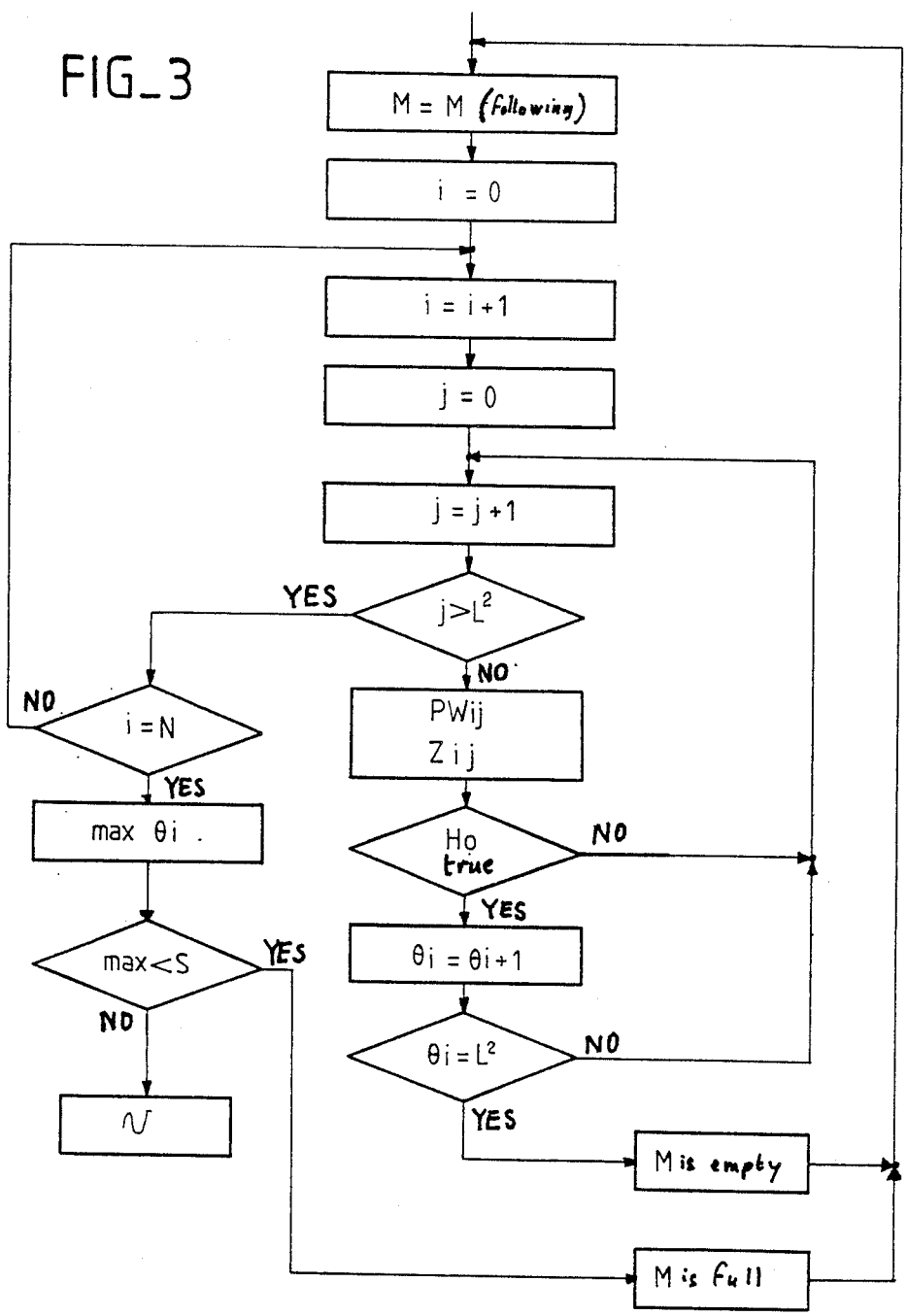
FIG_3

METHOD FOR IMAGE RECONSTRUCTION THROUGH SELECTION OF OBJECT REGIONS FOR IMAGING BY A COMPARISON OF NOISE STATISTICAL MEASURE

BACKGROUND OF THE INVENTION

1. Field of the Invention

The present invention relates to a method of reconstruction and processing of a three-dimensional object. More particularly, the invention is intended to permit reconstruction in three-dimensional space of an image of the spatial distribution of the radiological density of a vascular tree from a few two-dimensional projections of said tree acquired by radiology experiments. Radiology experiments are tomodensitometry experiments. In the general case, processing is concerned with display.

2. Description of the Prior Art

Digitized tomodensitometry is a conventional technique which makes it possible to reconstruct the spatial distribution of a characteristic physical quantity in a cross-section of an object illuminated by a given radiation (x-radiation, ultrasonic radiation, microwaves, etc.). To this end, the measurements employed are carried out on a segment of a straight line or of a curve contained in the plane to be reconstructed. One well-known example of devices of this type for carrying out this technique is the digitized x-ray tomodensitometer which has been in use for a few years in the medical imaging field. This technique can be extended in two ways for reconstructing the three-dimensional (3D) object. A first solution consists in producing a number of closely-spaced parallel cross-sections and then in regrouping them in a 3D space. A second solution consists in distributing in respect of each given radiation source position the points of measurement in space on a plane, for example, and no longer on a straight line. In the case just mentioned, the use of a two-dimensional detector makes it possible to carry out simultaneously all the measurements for a given position of the source and therefore to restrict the data acquisition time to a considerable extent. The invention relates to this second approach of the three-dimensional reconstruction.

In the case of x-ray imaging, the application of the principles set forth makes it necessary to reconstruct the 3D distribution of the linear attenuation coefficient of an object from a set of two-dimensional x-ray images taken at different angles of incidence. The measurements can be performed by means of an x-ray image amplifier or any other type of 2D detector or even 1D with scanning provided that it is displaced in such a manner as to acquire a 2D image at each position of the x-ray source. The relative position of the object and of the source-detector assembly is modified between each radiography. This can be achieved either by displacement of the source detector assembly by means of a device similar to that of digitized tomodensitometers or by means of vascular x-ray arches when the object is bulky in medical imaging or by displacement of the object itself when this latter is of small size. The second solution is more particularly suitable for use in nondestructive testing.

A number of methods are known for reconstructing a 3D object from x-ray images and can be classed in two main categories. A first category is concerned with direct analytical methods. These methods are derived from conventional 2D reconstruction methods by filtered back-projection. They consist in directly reversing the integral equation which relates the measurements to the object by utilizing an approximation of the 3D Radon transform in respect of small apex angles of the projection cone or by employing the exact expression of this transform.

These analytical methods are subject to a number of disadvantages. In the first place, they require a large number of projections distributed around the entire object in order to fill the "Radon domain" to a sufficient extent and to avoid reconstruction artifacts. In the second place, the truncation of projections, which is inevitable with the majority of objects of medical interest, introduces major artifacts. Finally, they offer low resistance to measurement noise.

The other methods are of algebraic type. They operate after discretization of the initial integral equation and consider the reconstruction problem as an estimation problem. They have been widely applied in the 2D case since the publication of the article by R. Gordon, R. Bender and G. T. Herman entitled "Algebraic reconstruction technic for three dimensional electron microscopy and x-ray photography", Journal Theo. Biol. 29, pages 471 to 481 (1970). These methods of estimation have shown their superiority over the analytical methods when the problem of reconstruction is of the type consisting of missing views (projections in a small angular sector and/or projections in small number) and/or of truncated views. These algebraic methods make it possible in fact to introduce a priori data on the solution, which are necessary for its stabilization. The drawback of this flexibility is a volume of calculations which may be prohibitive in the 3D case. These methods are therefore usually directed to making the most profitable use of a given a priori item of information. They are therefore specialized in the reconstruction of the single class of objects characterized by this a priori information.

The vascular trees opacified by injection of a contrast-enhancing product form a class of object of this type. This class of objects is in this case characterized by homogeneous a priori information, the 3D reconstruction of which is clearly advantageous. For physiological reasons and in the present state of opacification techniques, the acquisition of data can be carried out only in a narrow time range. Reconstruction must therefore be performed by means of a small number of projections. The projections of the vascular tree alone are obtained either by conventional techniques of logarithmic subtraction of radiographs taken at the same incidence before and after injection of a contrast enhancing product or by techniques (also conventional) of combination of radiographs taken at different energies. In all cases, the object is characterized by its positivity, its high contrast, its convexity, its "sparse" character as well as the sparse character of its projections. Positivity means that the value of the linear attenuation coefficient to be reconstructed is always positive. High contrast is brought about by the technique of opacification and subtraction. The convexity is induced by the treelike structure of the vessels under study. Finally, the "sparse" character is essential. When, an angiographic study is to be undertaken, vascularized tissues are eliminated by the aforementioned subtraction techniques. The projections of the vascular tree are then said to be "sparse" by analogy with a hollow or sparse matrix when it contains a majority of null elements since the points corresponding to the projection of the opacified tree correspond only to a few per cent of all the points of the subtracted image. Similarly, within the 3D space, a few per cent of the total volume are occupied by the vascular tree and the object can therefore also be qualified as "sparse". Other structures of medical interest (bones, etc.) can be characterized by the same a priori information and can therefore be processed by the invention.

Different approaches have already been proposed for reconstructing a 3D vascular tree. They can be classed in three categories. The first category is concerned with stereovision methods. These methods are derived from techniques developed in computer vision. They consist in putting in correspondence, in two views taken at neighboring incidences (angular separation of 6° to 15°) similar elements which are homologous to the object being observed. Knowing the geometry of acquisition and the coordinates of one element in each view, it is possible to deduce the coordinates of said element within the 3D space. These methods have the disadvantage of being sensitive to noise and providing low geometrical accuracy on the reconstructed object.

In order to improve this point, researches have been undertaken in order to work with two or three views taken in orthogonal directions. These extensions often involve other techniques, in particular artificial intelligence techniques for resolving ambiguities of putting in correspondence the significance of measurements belonging to different views but containing information about the same voxels in the body. But recourse even to blurred models of the tree to be reconstructed restricts the application of these methods to pathologies which do not depart too much from normal.

A second family of methods concerns the parametric algebraic methods. In order to reduce the volume of calculations, they seek to restrict the number of parameters to be estimated and utilize for this purpose a parametric model of the object which necessarily relies on a priori assumptions. Methods proposed thus make the assumption, for example, that the vessels have an elliptical cross-section. The problem of 3D reconstruction of a vessel having an elliptical cross-section basically consists in that case in estimating from measured projections the few parameters which define this ellipse in space: coordinates of its center, length of the major and minor axes, internal radiological density. These methods have the disadvantage of introducing a priori information which is too rigid. It is in fact not always possible, for example, to postulate that the cross-section of a blood vessel is elliptical. This assumption can accordingly play a disproportionate role with respect to the measurements in the determination of the solution. Thus the assumption of the elliptical cross-section, which is realistic in the general case, may prove to be false in pathological cases. And since the method of reconstruction is capable of providing only objects having an elliptical cross-section, it will therefore be conducive to errors of diagnosis.

The third methods contemplated are non-parametric algebraic methods. They do not utilize any parametric model of the object. This object is represented simply in the form in which it is sampled by a matrix of volume elements or voxels. Reduction of the number of calculations accordingly takes place by simplification of the method of estimation of the value of each voxel. For example, one technique consists of assigning to one voxel of the volume the minimum value of the measurements corresponding to the projections of said voxel in all the views. This is the so-called extreme value technique (EVT) which explicitly makes use of the fact that a vascular tree already occupies a very small part of the volume which surrounds it and that its projections also occupy a very small part of the radiographs. But this method is also based on the assumption that, for any voxel which does not belong to the tree, there exists at least one view in which this latter is projected with part of the tree, without superposition. This simple method and its variants thus have the disadvantage of resting on a flimsy hypothesis. Furthermore, they make it possible to reconstruct only the convex envelope of the objects. In fact, if these objects are concave, the regions of space which are not included in the object but contained in the concave portion of said object are always projected in conjunction with regions of the object. They are therefore always interpreted as belonging to the object. Finally, they attribute erroneous density values to the voxels of the tree. In point of fact, they substitute for the value of radiological density at a point the value of the integral of said density along the straight line of projection. The radiological density thus reconstructed will not be constant for example within a vessel having a circular cross-section even if the concentration of contrast-enhancing product is uniform.

SUMMARY OF THE INVENTION

An object of the present invention is to provide an improved method of reconstructing and processing of an image of a three-dimensional object without the deficiencies of the above-mentioned algebraic approaches. In the invention, the proposed 3D reconstruction is of the non-parametric type and proceeds in two successive steps. These two steps correspond to a step known as a detection stage followed by a second step or so-called estimation stage. The first detection stage aims to define an object-supporting region throughout the volume considered in order to reduce the calculations of the second stage. This second estimation stage is restricted solely to the voxels which are considered as having in this case a high probability of really belonging to the object. In addition, the first detection stage is carried out statistically. This is tantamount to stating that the object support will be determined as a function of an error rate which is fixed beforehand. This error rate can in particular be influenced by the measurement noise.

The invention is therefore directed to a method of reconstruction and processing of an image of a three dimensional object in which:

the object is subjected, in different orientations corresponding to views, to radiological examinations during which an x-radiation which passes through the object is measured each time by a two-dimensional detector in order to produce a view, results of measurement are stored in a set of views, the method being distinguished by the fact that the views are processed in two stages with a view to reconstructing the object, a first stage designated as a detection stage being followed by a second stage designated as an estimation stage, the first detection stage involves determination of a geometrical support of the object, this support being constituted by all the volume elements or voxels which belong to the object, the detection stage involves evaluation of the statistics of the signal measured in a view and corresponding to a region of the object, and making a decision for incorporating said region of the object in the support as a function of the comparison of said statistics with the statistics of a measurement noise, the second stage involves reconstruction of the portions of the object which are contained in the support, and by the fact that the reconstructed object is thus processed.

BRIEF DESCRIPTION OF THE DRAWINGS

FIG. 2 is a flow diagram for the application of the different stages of the method.

FIG. 3 is a flow diagram of a preferred alternative embodiment of the invention.

DESCRIPTION OF THE PREFERRED EMBODIMENTS

Figure 1:
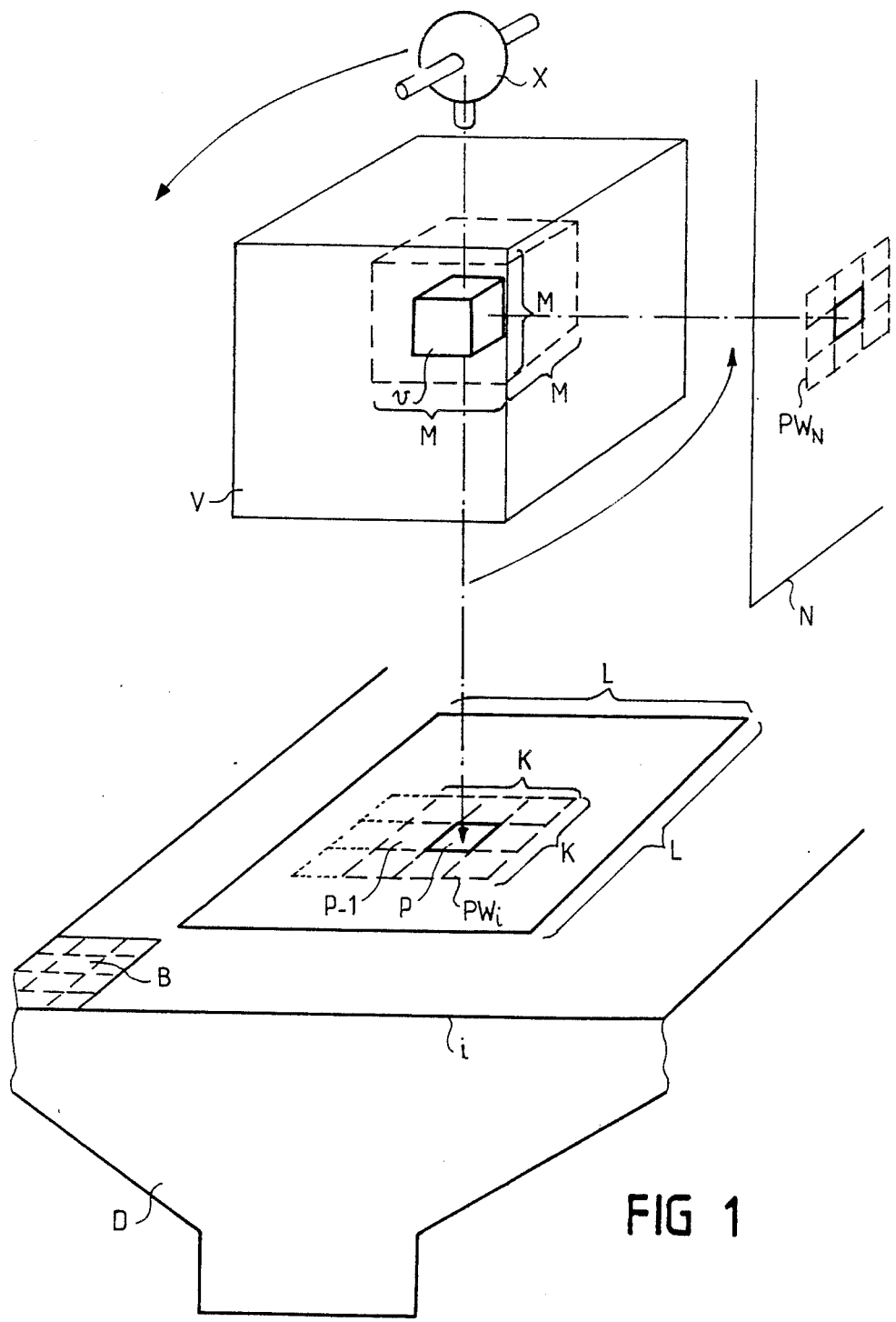
FIG. 1 is a schematic representation of the mode of acquisition of the 2D images and of the particularities of the processing operation in accordance with the invention.

FIG. 1 shows the cubic envelope of a volume V to be reconstructed as represented in the form of voxels v. This volume has been subjected to irradiation by an x-ray generator X. Irradiation measurements have been performed by a two-dimensional detector D placed opposite to the generator X with respect to the volume V. Detection of the region of the object support consists in principle in deciding for each of the voxels of said envelope whether it belongs or does not belong to the object to be reconstructed. If it does belong to the object to be reconstructed, the voxel will be said to be full. If it does not belong to the object, the voxel will be said to be empty.

The method employed for this purpose is a method which makes use of the local or global statistical properties of the object. In the case of each voxel of the volume, it is sought to employ all the available data. Thus the set of available data corresponding to one voxel is the set of measurements corresponding to the surface elements or pixels of the views in the vicinity of the geometrical projection p of the voxel on said views. These measurements are delivered by a two-dimensional detector D. Each measurement is assigned to a surface element of said detector and therefore corresponds to one pixel of the view. It is supposed that, for each empty voxel, there exists at least one view in which said voxel is not superimposed on the projection of a full voxel at the time of projection. It can be stated that said view has a separating effect in the case of said voxel. This assumption is verified even more by virtue of the fact that the objects considered are sparse and also have sparse projections. A simple decision rule accordingly consists in rejecting from the support region any voxel for which there exists at least one view in which the measured values in the vicinity of the projection of said voxel correspond only to noise.

With this objective, it will be possible to measure the noise. Measurement of noise can be performed in several ways. It will be preferable to measure said noise view by view by evaluating in each view at a location B (which is known to be external to the projection of the volume) the mean value of the measurements assigned to the pixels. In fact, in the regions in which it is known that no projections of the object are present, the signal measured at the moment of radiological experiments and corresponding to these regions is not zero and corresponds only to noise. It is in fact the result of the detection noise and of the preliminary treatment noise.

Preferably, the region B is taken in one corner of the view. The measurement of the noise will be denoted by $m_0$.

The method of the invention can be carried out in a number of different ways. In one example, a hierarchized step is proposed which has the main advantage of reducing the volume of calculations by performing complex calculations only where necessary. The following discussion will first be concerned with the principle of the method adopted, then with its application with variable resolution in order to limit the number of calculations.

Consider a voxel v and, in each view i (i=1, ..., N), a projection window $PW_i$ of size $K \times K$ (K being preferably an odd number) centered on the pixel p corresponding to the geometrical projection of the voxel v. It can be postulated that, within each window $PW_i$, the measured values of the pixels, denoted by $g_i^{m,n}$ (m,n = 1, ..., K) are $K^2$ observations of a random variable $P_i$ having a mean value $m_i$ and a standard divergence $\sigma_i$. The value of the random variable $P_i$ is clearly the measured value which preferably results from subtraction of images in accordance with the invention. The problem of detection can accordingly be formulated statistically as follows. It consists in testing a hypothesis $H_0$ against a hypothesis $H_1$. The hypothesis $H_0$ means that the voxel v is empty, the hypothesis $H_1$ means that the voxel v is full. This test must clearly be performed with a knowledge of the observations $g_i^{m,n}$ in the case of all the views.

In order to carry out this test, there is introduced an estimator of the random variable $P_i$. More precisely, this estimator of the mean value concerns an estimator of the mean value and of the variance of the random variable $P_i$. This estimator will be denoted by $\hat{m}_i$ since it will be calculated view i by view i. In the remainder of the description, the estimator $\hat{m}_i$ of the mean value of said random variable will be compared with the mean value $m_0$ of noise. The estimator of the mean value employed is of the type $$\hat{m}_i = 1/K^2 \sum_{m,n=1}^{m,n=K} g_i^{m,n} \qquad \text{I}$$

Similarly, the estimator of the variance is as follows:

$$\sigma_i = 1/(K^2 - 1) \sum_{m,n=1}^{m,n=K} (g_i^{m,n} - \hat{m}_i)^2 \qquad \text{II}$$

In these expressions $K^2$ is the number of pixels of the square window centered on the projection p of the voxel v in the view i.

In the example of practical application of the invention, it has been assumed that the observations $g_i^{m,n}$ were independent and that the random variable $P_i$ was Gaussian. It has then been found necessary to elaborate a so-called Student variable $Z_i$ expressed as follows:

$$Z_i = (\hat{m}_i - m_0)/\sqrt{\sigma_i^2/K^2} \qquad \text{III}$$

It has in fact become apparent that the statistic of $Z_i$ followed a Student law having $K^2 - 1$ degrees of freedom, centered under the hypothesis $H_{0,i}$ in which the observed mean is equal to the noise mean and not centered under the hypothesis $H_{1,i}$ in which the observed mean is higher than the noise mean The parameter of non-centrality is then equal to:

$$\delta_i = (\hat{m}_i - m_o)/(\sigma_i/K) \qquad \text{IV}$$

In these expressions, i designates the view i. This reformulation actually consists, in order to test whether a voxel v belongs or does not belong to the support of the object to be reconstructed, in calculating in a window $PW_i$ the estimator of the mean value $\hat{m}_i$ given in I, similarly in calculating the estimator of the variance given in II, and finally in calculating the Student variable $Z_i$ according to the expression III, the mean value $m_0$ of noise being known. The table of the Student law being then known, for the degree of freedom $K^2-1$, it is possible in the case of a given confidence level $\alpha$ corresponding to a threshold $t_\alpha$ to determine whether $Z_i$ is higher than $t_\alpha$. The threshold $t_\alpha$ is given by the table. By comparing $Z_i$ to $t_\alpha$, it is then possible to decide whether the hypothesis $H_{0,i}$ is true or not. If $Z_i$ is higher than $T_\alpha$ for example, $H_{0,i}$ is rejected with a confidence level $\alpha$.

In the problem of detection of the region of the object support as presented earlier, the hypothesis made on the existence of separating views implies that the hypothesis $H_0$ is true if and only if there exists at least one view i for which $H_{0,i}$ is true. The hypothesis $H_0$ is therefore equivalent to the union of the hypotheses $H_{0,i}$ with i having values from 1 to N. Thus $H_0$ will be rejected or, in other words, the voxel v will be declared full with a confidence threshold $\alpha$ if the minimum value of all the variables $Z_i$, where i has values from 1 to N, is higher than $t_\alpha$.

FIG. 2 shows a flow diagram which represents this procedure. It will be found preferable to study the entire volume voxel by voxel and, in the case of each voxel, view by view. It would naturally be possible to study view by view and to give the result of the test at each view in the case of all the voxels of the volume. This method would nevertheless make it necessary to provide processing memories of very high capacity in the computers which perform this verification. On the other hand, in the voxel-by-voxel procedure and in the case of a view-by-view voxel, it is only necessary in the case of the voxel under study to calculate, at each view, its projection and finally the coordinates of the window $PW_i$ which is associated therewith. If in the case of any view i, the hypothesis $H_{0,i}$ proves to be verified, it is possible to determine that the voxel is empty since in that case H0 is also verified, and then to proceed to the next voxel. On the other hand, if this hypothesis is not verified, it is first necessary to pass to the following view. It is only when all the views have been examined that it is possible to determine that the voxel is full before passing to the following voxel.

In the application of the method described above, the high calculation loads are related to calculation on the one hand of the coordinates, in a detector reference frame associated with the view i, of the geometrical projection of each voxel v and of its window $PW_i$. Furthermore, it is also necessary to calculate the Student variable in the case of each associated window $PW_i$. In order to reduce this volume of calculations, calculation of the Student statistic of each projection is carried out beforehand in all views.

This means that, in the case of each pixel j of a view i, the corresponding Student variable $Z_{i,j}$ is calculated on a predetermined vicinity K. In order to calculate the Student variables $Z_{i,j}$ relating to all the pixels j of the view i, it is found preferable to proceed by sliding calculation.

Thus in FIG. 1, it is possible to employ for the pixel p the results acquired in the case of the pixel p-1 which was calculated just before. For example in the calculation of $\hat{m}_{p-1}$, the contributions corresponding to the pixels delimited by dashed lines are removed and the contributions due to the three pixels located to the right of the pixel p are added. For the calculation of $\sigma_{p-1}$, the squares of the values of the pixels are removed along the dashed lines, there are then added the squares of the values of the (three) pixels located opposite to the dashed lines (on the right) and finally $\hat{m}^2_{p-1}$ is replaced by $\hat{m}^2_p$ which has been calculated earlier. The treatment can thus be accelerated by means of preliminary calculations carried out systematically and by making use of preceding intermediate results.

The practical application of the flow diagram of FIG. 2 entails the need to determine N, K and $\alpha$. From this, $t\alpha$ is accordingly deduced. A voxel v is then taken into consideration. There are then calculated in the case of a first view (i=1) the estimators $\hat{m}_i$, $\sigma_i$ from which is drawn $Z_i$. A comparison is then made between $Z_i$ as thus defined on a window $PW_i$ and $t\alpha$. Either it is deduced therefrom that v is empty (and one proceeds to the following voxel) or else it is not deduced and one proceeds to the following view. One proceeds to the following voxel when the N views have been tested. In this case, v is declared full.

Furthermore, in order to accelerate the calculations even further, the volume can be explored with a resolution which is lower than the effective resolution. To this end, one defines mega-voxels formed by the union $M^3$ voxels as indicated in FIG. 1. M is preferably chosen so as to be odd-numbered for reasons of simplicity so as to have a voxel v which is exactly centered. The method employed is accordingly represented by the flow diagram of FIG. 3. In the case of a given mega-voxel M and in the case of a first view to be studied, calculations are performed as above and one stores the distribution of Student variables corresponding to a collection of $L^2$ windows $PW_{i,j}$. This step can also be performed beforehand as indicated earlier. The complete set of windows $PW_{i,j}$ includes the windows contained in a mega-window $L \times L$: this mega-window corresponds to the projection of the mega-voxel M. In the case of each of these windows $PW_{i,j}$, it is checked whether the hypothesis $H_{0,i,j}$ is verified. If $H_{0,i,j}$ is true in the case of a window $PW_{ij}$, one increments a counting variable $\theta_i$ and one proceeds to the following window (as long as j is smaller than $L^2$). When all the windows $PW_{ij}$ of a mega-window $L^2$ have been examined, if the counting variable $\theta_i$ is equal to $L^2$, this means that all the voxels of the mega-voxel are empty. They are treated as such. In this case, one proceeds to the following mega-voxel. If on the contrary $\theta_i$ is not equal to $L^2$, although all the windows contained in said mega-window ($j = L^2$) have been examined, one proceeds to the next view. If the N possible views have not all been examined and if it can be determined at a following view that M is empty, it is then possible to proceed again to the following mega-voxel by declaring as empty all the voxels of the mega-voxel which have just been treated.

Let us suppose on the other hand that all the views have been examined with regard to a mega-voxel and that it has not been possible to determine that the mega-voxel was empty. One accordingly determines the maximum of the counting variables $\theta_i$ corresponding to the N views examined. If this maximum is below a predetermined threshold S, it is then considered that all the voxels of the mega-voxel considered are full. In fact, if the maximum value of the counting variables $\theta_i$, where i varies from 1 to N, is lower than a threshold value S (a low threshold value S having been chosen beforehand) it may be deduced therefrom that, irrespective of the views examined, there have always been many windows for which $H_{0,i}$ was not vertified. In fact, in each of these views, $\theta_i$ is of small value. If $H_{0,i}$ is not often verified, this means that on the contrary, the voxels of the mega-voxel belong to the object most of the time. In consequence, in the present invention, false alarms are thus favored at the expense of non-detections. This means that it will be found preferable to consider that a voxel belongs to the object support even if it does not do so in actual fact, rather than to take the risk of stating that it does not belong to the object support whereas it does in fact do so.

In the contrary case in which the maximum value of the counting variables $\theta_i$ is higher than the threshold value S, one is faced with a situation in which the number of empty voxels is too large. It is chosen in this case to make a finer analysis on the voxels themselves. This finer analysis is undertaken as shown in the diagram of FIG. 2. In other words, the method in this case is performed in two stages. In the first stage, mega-voxels are examined and it is determined whether all their voxels belong to the object support or not. When it proves impossible to reach this conclusion after this first examination, each voxel of the mega-voxel concerned is examined before proceeding to a following mega-voxel.

By reason of the noise in the data, detection cannot be perfect. In order not to lose vessels of small size or in other words in order to reduce non-detections (the fact of eliminating a voxel which would be full by considering it as empty), the detection thresholds must be set at a fairly low level. The result thereby achieved is to produce a certain number of false alarms, that is to say voxels declared full whereas they do not belong to the object. It is therefore possible to improve the quality of the support region obtained by the method of the invention by carrying out an additional step which is intended to eliminate isolated points and to reunite segments which have been accidentally separated. This step is preferably performed by means of 3D mathematical morphology operations such as a closure. This step is performed on the detected support region. It is recalled that a closure is a topological operation comprising an erosion followed by a dilation. During an erosion of a 2D image, there are examined all the pixels located within a box having given dimensions, for example in this case a box which is capable of containing nine pixels. In this erosion, there is assigned to a pixel located at the center of the box a value corresponding to the minimum value of the detected signal for the pixels of said box. Once this erosion has been completed, there is obtained another representative image of the view. On this other image, there is then performed a dilation. During this dilation, preferably with one and the same box, there is assigned this time to the pixel of said other image placed at the center of the box the maximum value of the signal assigned during erosion to the adjacent pixels. It is shown that, by proceeding in this manner, the data contained in the pixels which really correspond to projections of the object are disturbed only very slightly whereas the isolated points can readily be made to disappear. These methods of the mathematical morphology type are well-known and already employed in image processing.

The second stage of the method in accordance with the invention consists in reconstructing the object from its support which has thus been purified. This reconstruction preferably consists in estimating the value of each voxel which belongs to the detected support region. For this purpose, an algebraic reconstruction technique is employed. This technique is for example of the type mentioned in the foregoing and is based on the Kaczmarz method. This Kaczmarz method permits iterative and recursive calculation of the generalized inverse of linear system. In this method without preliminary definition of the support, even when the operation is limited to a small number of iterations, a long calculation time would have to be contemplated. This period of time is essentially devoted to calculation and to retroprojection of residues at the time of each recursion. The preliminary step of detection of the invention permits a considerable reduction in volume of calculations during this estimation stage. Typically, only 10 % of the volume for the vascular trees is affected by the detected support. In the case of the voxels which do not belong to the object support, their value is arbitrarily fixed at zero. As a result, the background of the reconstruction and the background of the images drawn therefrom are thus free from retroprojection artifacts. This can greatly simplify subsequent treatments on the reconstructed object.

By means of conventional 3D display operations, it is then possible to visualize (to see views) the surface of the reconstructed object or to present cross-sections of this latter. It is also possible on the reconstructed object to carry out measurements, for example of mean density, of mean length of the segments, etc. These displays or measurements are directed to technical processing of the reconstructed object. These operations are known in other respects.

What is claimed is:

1. A method of reconstruction and processing of an image of a three-dimensional object, comprising:
    subjecting the object, in different orientations corresponding to views, to radiological examinations during which an x-radiation which passes through the object is measured each time by a two-dimensional detector in order to produce a set of measurement data for each view;
    storing said measurement data;
    processing said measurement data in two stages in order to reconstruct the image of the object, a first stage designated as a detection stage being followed by a second stage designated as an estimation stage,
    the detection stage determining a geometrical support region of the object, said support region comprising all the volume elements or voxels which belong to the object,
    the detection stage evaluation the statistics of the signal measured in a view and corresponding to a region of the object, and making a decision for incorporating said region of the object in the support region as a function of the comparison of said statistics with the statistics of a measurement noise, and
    the estimation stage reconstructing portions of the image of the object which are contained in the support region; and processing the image of the object thus reconstructed.

2. A method according to claim 1, wherein evaluating the statistics comprises:
   evaluating region-by-region and, hierarchically, evaluating view-by-view for each region.

3. A method according to claim 1, wherein evaluating the statistics comprises:
   calculating an estimator of the mean value and an estimator of the variance of a random variable, values of said random variable being constituted by results of measurements in regions of the detector located vertically above and in the vicinity of a region under study, and
   constructing a Student variable from these estimators and from an expectation value of measurement noise; and
   wherein the decision-making comprises comparing said Student variable with a reference value given by a Student law as a function of a predetermined confidence level and degree of freedom.

4. A method according to claim 1, wherein
   the regions are mega-voxels;
   evaluating the statistics comprises elaborating, in the case of each view, a collection of Student variables and a hypothesis test on each of these variables; and
   the making of an incorporation decision comprises eliminating from a support region all the voxels of a mega-voxel if all the tests of a collection corresponding to a view are positive.

5. A method according to claim 4, wherein the making of an incorporation decision comprises taking into account, in the support region, all the voxels of a mega-voxel if, in the case of said mega-voxel and irrespective of the collections, the maximum of the number of positive tests is below a threshold value.

6. A method according to claim 4, wherein the making of an incorporation decision of a voxel further comprises subsequently studying, voxel by voxel, all the voxels of the mega-voxel in the case of all the views, if the maximum of the number of positive tests is higher than a threshold value and is lower than the number of tests of the collection.

7. A method according to claim 1, wherein the estimation stage comprises applying an algebraic method.

8. Utilization of the method according to claim 1 in an angiographic imaging experiment or in an experiment which involves imaging of any other object having a high contrast.

* * * * *